NOISE IMMUNITY CIRCUITRY FOR TV REMOTE CONTROLS

Filed March 18, 1965

INVENTOR
R.O. WHITAKER

United States Patent Office
3,471,833
Patented Oct. 7, 1969

3,471,833
NOISE IMMUNITY CIRCUITRY FOR TV REMOTE CONTROLS

Ranald Otis Whitaker, 402 E. 28th St., Indianapolis, Ind. 46205

Filed Mar. 18, 1965, Ser. No. 440,808
Int. Cl. H04q 1/18
U.S. Cl. 340—171 4 Claims

ABSTRACT OF THE DISCLOSURE

Ultrasonic TV remote control systems generally suffer from inteference due to noise sources such as jangling keys, tinkling glasses, and certain toys. Such signals generally cover a band of frequencies sufficiently broad to include two of the signal channels of the remote control system. This invention provides relay circuitry in the ultrasonic receiver which deactivates the remote control whenever two adjacent channels receive signals simultaneously.

This invention relates to wireless remote control systems for use with domestic television receivers and more particularly to relay circuitry for reducing the disturbing effect of extraneous signals reaching the receiver portion of the remote control system.

In a typical remote control system the viewer operates an ultrasonic transmitter which generates several discrete ultrasonic signals. The frequencies correspond on a one-to-one basis to TV receiver functions to be controlled—such as channel, volume, color, tint, contrast, and brightness.

Unfortunately, ultrasonic signals capable of operating conventional remote control systems are also generated by jangling keys, tinkling glasses, whistles, and toys of various kinds. Such extraneous signals are termed noise. Usually they consist of a mixture of ultrasonic signals covering a band of frequencies—seldom is an extraneous signal a pure sine wave of one frequency. Consequently, a noise signal will generally cause an output to be developed in two or more tuned circuits. This causes corresponding control operations to be performed simultaneously.

According to the present invention, relays in the output sections of the tuned circuits are so wired that when any two adjacent frequency signals are received, no control operation can take place. The desired result is obtained by cross-wiring the output circuits of the relays in the selector circuits.

Accordingly it is the object of the present invention to provide a wiring plan involving the output circuits of the relays in a remote control system which plan will prevent relays from performing their control functions whenever any two adjacent frequency signals are received simultaneously.

Reference is made to the accompanying drawings in which.

Figure 1:
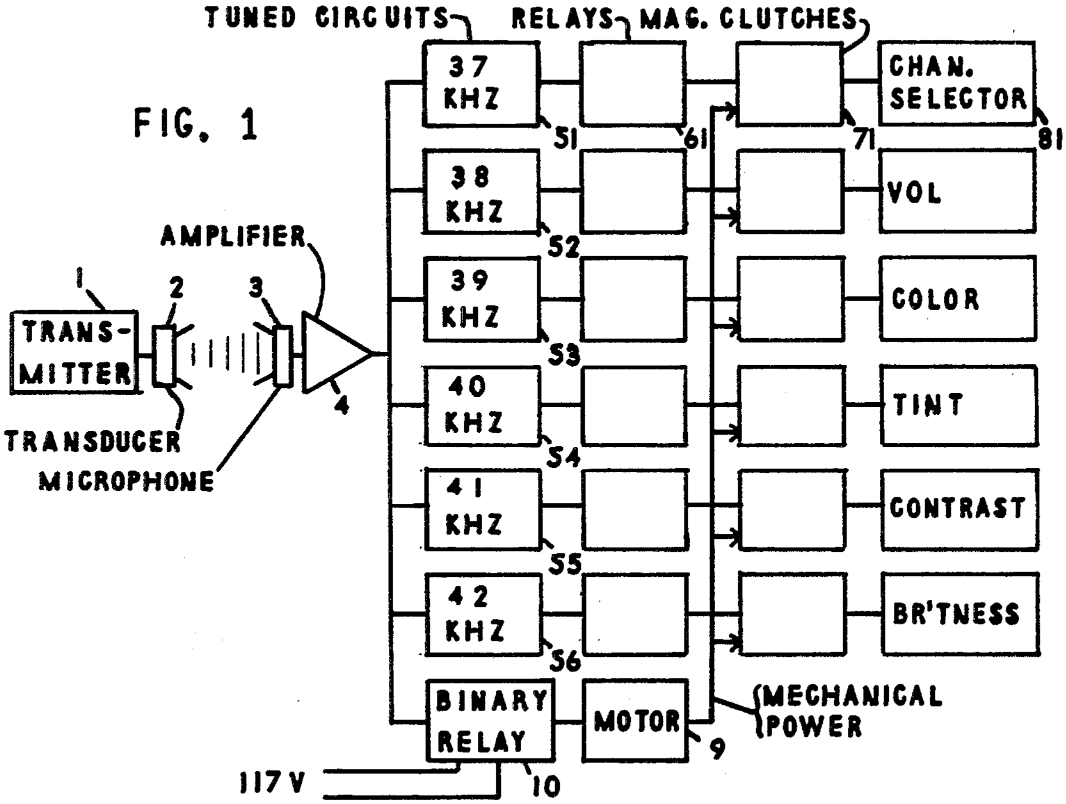
FIG. 1 is a block diagram of a conventional remote control system in which the present invention could be used.

Referring to FIG. 1, transmitter 1 in a preferred system is a transistor oscillator capable of generating selectively one of several frequencies. It feeds to transducer 2 which converts the received electrical signals to acoustical signals beamed through the air to microphone 3 located in the front of the TV receiver. Microphone 3 feeds to amplifier 4. Amplifier 4 feeds to tuned circuits 51–56 inclusive.

If a 37 kHz. signal is received, tuned circuit 51 develops an output which operates relay 61. Operation of relay 61 causes magnetic clutch 71 to couple motor 9 to channel selector 81. Thus the transmission of a 37 kHz. signal by the viewer operating transmitter 1 causes the channel selector of the TV receiver to be changed.

Similar action involving the other channels takes place when others of the discrete frequency signals are transmitted.

Motor 9 is a reversible motor. Direction is determined by binary relay 10. Binary relay 10 changes binary position on each successive reception of a signal from amplifier 4. In this preferred system the viewer notes the direction in which the control will move upon receipt of the next signal. If this is the desired direction, he activates the transmitter for as long as he desires the control to move. If it is not the desired direction, he activates the control for just long enough for the binary relay to change binary positions and then activates it a second time for as long as he desires the control to move. Since the inertia of the motor is large relative to the inertia of the armature of the binary relay, virtually no control adjustment is made during the initial activation.

In alternate systems, direction is indicated by a chopping rate of the ultrasonic signal or by separate discrete frequencies for direction. The last is undesirable because it doubles the number of frequencies to be transmitted.

Ultrasonic microphones, amplifiers, tuned circuits, and relays are well known in the art. A preferred magnetic clutch is described in U.S. Patent 2,743,797. A preferred channel selector drive mechanism is described in U.S. Patent 3,162,794. A capacitor or wound shaded pole motor may be used.

Figure 2:
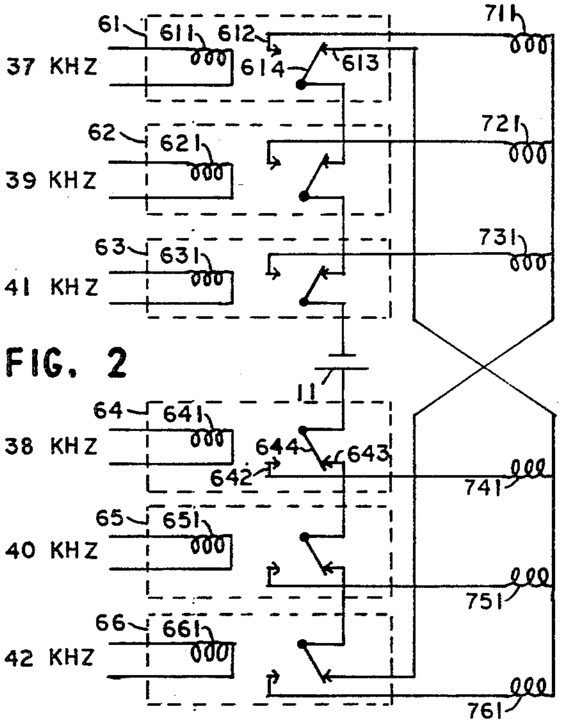
FIG. 2 is a schematic showing relay switches wired in accordance with the present invention.

FIGURE 2 is a schematic showing interconnections in accordance with the present invention. Pertinent parts of relay 61 are activation coil 611, arm 614, normally closed contact 613, and normally open contact 612. Other relays ars similar. Relay arms are shown in the normally open position. It is noted that no electrical circuit is completed through power source 11 and any of the clutch coils 711 to 761.

Consider that relay coil 611 is activated in response to a 37 kHz. signal. Arm 614 moves from contact 613 to contact 612. This completes a circuit including power source 11 and clutch coil 711.

Activation of any of the other relay coils 621 to 661, singly and alone, connects power source 11 to its corresponding clutch coil.

Consider next that relay coils 611 and 641 are simultaneously activated in response to 37 and 38 kHz. signals. The circuit through clutch coil 711 is broken by arm 644 being moved from contact 643 to contact 642. The circuit through clutch coil 741 is broken by arm 614 being moved from contact 613 to contact 612. Consequently no control action can take place.

A similar deactivation of the remote control system takes place when any combination of signals involving at least one signal in the first group and one signal in the second group is received.

A battery is shown as power source 11. However, any source of electrical power either AC or DC may be employed.

Magnetic clutches have been indicated as the elements activated by the relays. However, the clutches may be replaced by solenoids, other relays, stepping switches, or individual motors.

I claim:

1. Electric drive circuitry comprising:

a source of electric power;

a first group of single-pole double-throw switches;

a first group of electric elements to be driven corresponding on a one-to-one basis with said switches in said first group;

a second group of single-pole double-throw switches; and a second group of electric elements to be driven corresponding on a one-to-one basis with said switches in said second group;

each of said switches in said groups having an arm, a normally closed contact, and a normally open contact;

each of said elements in said groups having a first electrical input terminal and a second electrical input terminal;

said source being connected between the arm of the first switch of said first group and the arm of the first switch of said second group;

the normally closed contact of the last switch in said first group being connected to the first terminal of each element in said second group;

the normally closed contact of the last switch in said second group being connected to the first terminal of each element in said first group;

the normally closed contact of each remaining switch being connected to the arm of the switch next in order; and the normally open contact of each of said switches being connected to the second terminal of its corresponding element.

2. Electric drive circuitry as in claim 1 and employed in the receiver portion of an ultrasonic TV remote control, each of said switches being operated by a relay in turn responsive to an ultrasonic signal of particular frequency.

3. Electric drive circuitry as in claim 1 and employed in the receiver portion of an ultrasonic TV remote control, each of said switches being operated by a relay in turn responsive to an ultrasonic signal of particular frequency, said frequencies taken in order being assigned alternately to said first and second group.

4. Electric drive circuitry as in claim 1 and employed in the receiver portion of an ultrasonic TV remote control comprising a transmitter of ultrasonic signals of discrete frequencies and operated by the viewer, a receiver positioned at the TV set and comprising a microphone for receiving said ultrasonic signals, an amplifier, tuned circuits for separating said signals according to discrete frequency, and relays responsive on a one-to-one basis to the outputs of said tuned circuits and operating switches on a one-to-one basis.

References Cited

UNITED STATES PATENTS 3,066,245 11/1962 Baker et al.

DONALD J. YUSKO, Primary Examiner

U.S. Cl. X.R.

343—228